United States Patent [19]

O'Meara

[11] Patent Number: 4,498,184
[45] Date of Patent: Feb. 5, 1985

[54] JINC-TRAP RESONATOR

[75] Inventor: Thomas R. O'Meara, Malibu, Calif.

[73] Assignee: The United States of America as represented by the Secretary of the Air Force, Washington, D.C.

[21] Appl. No.: 484,327

[22] Filed: Apr. 12, 1983

[51] Int. Cl.³ .............................................. H01S 3/08
[52] U.S. Cl. .............................. 372/92; 350/162.12; 350/162.16; 372/99
[58] Field of Search ............... 372/92, 99; 350/162.12, 350/162.16

[56] References Cited

U.S. PATENT DOCUMENTS 3,136,959  6/1964  Culver ................................. 372/103

OTHER PUBLICATIONS

Concetto R. Giuliano, "Applications of Optical Phase Conjunction," *Physics Today*, Apr. 1981, pp. 27-30, 32-35.
David M. Pepper, "Nonlinear Optical Phase Conjugation," *Optical Engineering*, Mar./Apr. 1982, vol. 21, No. 2, pp. 156-183.
T. R. O'Meara, "Jinc Trap Resonators", Mar. 1983, Abstract of Apr. 15, 1982, Conference on Lasers Oral Presentation.

*Primary Examiner*—William L. Sikes
*Assistant Examiner*—Léon Scott, Jr.
*Attorney, Agent, or Firm*—Donald J. Singer; John R. Flanagan

[57] ABSTRACT

A Jinc-trap resonator has a Fourier transform resonator structure with a Jinc-trap spatial filter disposed in one of two opposite end transform planes. A near Jinc-like mode is effectively trapped at the one plane where the filter is located, while a corresponding transform mode that is nearly constant in amplitude and flat in phase is located at the opposite transform plane. The Jinc-trap spatial filter is composed of a first series of concentric absorption bands and a second series of concentric reflecting bands which alternate in position with the absorption bands.

8 Claims, 7 Drawing Figures

JINC-TRAP RESONATOR

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to optical systems for extracting energy from the gain medium of a laser and, more particularly, is concerned with a Fourier transform resonator which incorporates a Jinc-trap spatial filter which forms broad, high quality, modes that efficiently fill the laser gain medium.

2. Description of the Prior Art

The multipass character of laser oscillators greatly enhances the distortion potential of intracavity perturbations and aberrations. In particular, the effect of laser medium index inhomogeneities resulting from flow or pump variations, density or concentration fluctuations or simply thermal effects can degrade the wavefront exiting from a laser more than a similar extracavity disturbance. Similarly, the effect of mirror misalignments is greatly accentuated compared to normal (extracavity) optical trains.

In principle, the resulting wavefront errors can be corrected either intracavity or extracavity. However, these internal errors lead to both amplitude distortions and vignetting of the output beams that are not easily compensated with extracavity systems. Thus, it is essential to concentrate on intracavity correction systems. Further, the resulting intracavity errors may sometimes have an extremely high spatial frequency content. Since nonlinear conjugation and/or other nonlinear compensation systems offer excellent capability for correcting high spatial frequency distortion, as contrasted with conventional adaptive optics with deformable mirrors, it is preferable to use such systems in intracavity compensation.

Consequently, a need exists for an optical system, preferably of the nonlinear type, which compensates for aberrations in the laser gain medium in a simple way and at low cost compared with deformable mirror systems.

SUMMARY OF THE INVENTION

The present invention provides a Fourier transform resonator employing a Jinc-trap spatial filter which is designed to satisfy the aforementioned needs. The resonator creates extremely flat, broad modes which efficiently fill the gain medium of a laser, such as the oxygen-iodine laser that is currently under development by the U.S. Air Force. An improved stable resonator is thereby provided having modes which more efficiently extract power from the laser gain medium and form smaller focal spots than conventional stable resonators. This improved resonator construction avoids the requirement for beam-center fill-in optics which are typically employed in conventional unstable resonators. Further, the spatial filter used in this improved resonator is fully compatible with employment of a phase conjugate mirror therein.

Accordingly, the present invention is directed to a Jinc-trap resonator, which comprises the combination of: (a) a Fourier transform lens defining an optical axis with right and left transform planes disposed along the axis one focal length from either side of the center of the lens; (b) a laser gain medium located between the lens and a first one of the right and left transform planes; (c) reflecting means disposed at the first one of the transform planes; and (d) a Jinc-trap spatial filter disposed at the second one of the transform plane. A near Jinclike field distribution, $J_1(X)/X$, is effectively trapped at the second transform plane, while the corresponding transform mode at the opposite first transform plane, adjacent to where the gain medium is located, is nearly constant in amplitude and flat in phase.

DETAILED DESCRIPTION OF THE INVENTION

Figure 1:
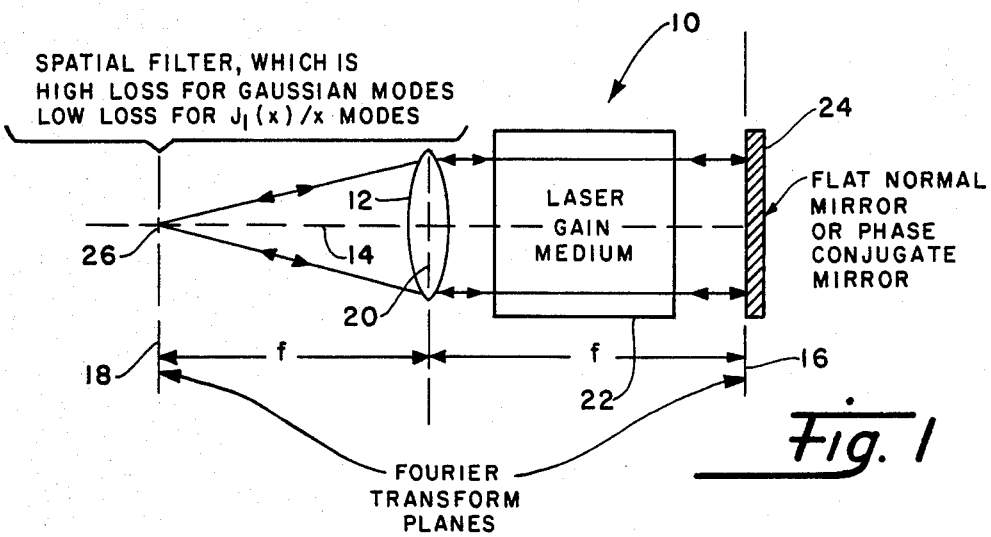
FIG. 1 is a schematic side elevational view of a basic Fourier transform resonator with a mode selecting spatial filter at its left transform plane in accordance with the principles of the present invention.

Referring now to the drawings, and more particularly to FIG. 1, there is shown in schematic form the Jinc-trap resonator of the present invention, being generally designated 10. The resonator 10 includes a Fourier transform lens 12 which defines an optical axis 14 with right and left transform planes 16, 18 disposed along the axis at focal length, f, from either side of the center line 20 of the lens 12. Also, a laser gain medium 22 is disposed at a location along the optical axis 14 between the lens 12 and the right transform plane 16. At the right transform plane 16 is disposed reflecting means 24, which may take the form of a normal mirror or a phase conjugate mirror. At the left transform plane 18 is disposed a Jinc-trap spatial filter 26.

Due to the presence of the Jinc-trap filter 26, a near Jinc ($J_1(X)/(X)$) mode is effectively trapped at the left transform plane 18 of the lens 12. As a result, a corresponding transform mode that is nearly constant in amplitude and flat in phase is located at the right transform plane 16. The filter 26 functions to preferentially increase the losses of Gaussian-like field distributions relative to those (losses) of a Jinc-like field distribution. Ideally, if the resonator 10 truly produced a Jinc mode (a Bessel function) at the left plane 18, then the field distribution at the right plane 16 should be exactly flat (a cylinder or top-hat function), without phase or amplitude ripple.

Figure 3:
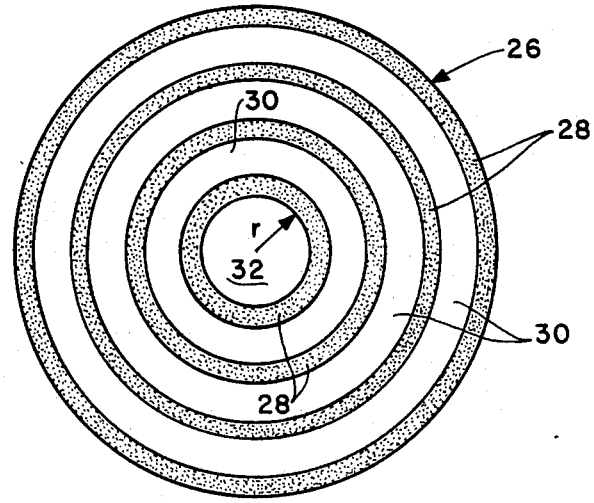
FIG. 3 is an enlarged front elevational view of the Jinc-trap spatial filter as seen along line 3—3 of FIG. 2.
Figure 2:
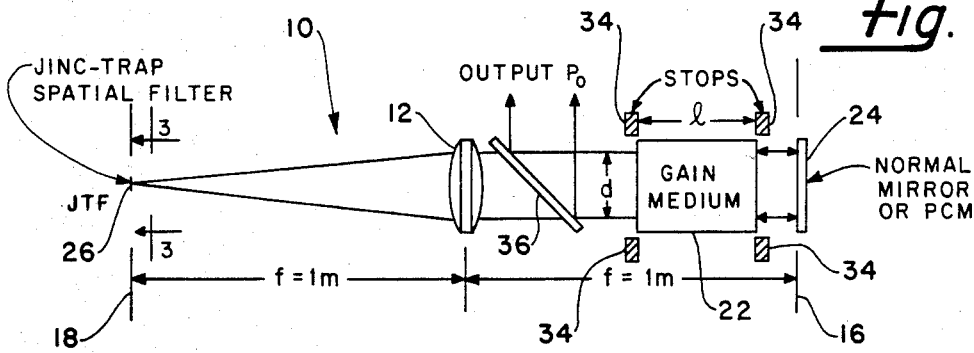
FIG. 2 is a more detailed side elevational view of a Jinc-trap resonator in accordance with the principles of the present invention.

The Jinc-trap spatial filter 26, more clearly shown in FIG. 3, is comprised of a first series of concentric absorption bands 28 and a second series of concentric reflecting bands 30 which alternate in position with the absorption bands 28. Also, the second series includes an inner central circular area 32 which is reflecting. In an exemplary embodiment, the central area 32 is about $1 \times 10^{-4}$ cm$^2$. The first series of absorption bands 28 are centered on the nulls of $(J_1(X)/(X))$, produced by a circular aperture of diameter, d, as illustrated in FIG. 2. Thus, the filter 26 has low loss (under 0.5%) for the desired Jinc mode and much higher loss for competitive modes having Gaussianlike shapes. In an exemplary embodiment of the resonator 10, f=1 meter, d=1 cm, and $\lambda$=1.3 $\mu$m.

As was mentioned above, the right-hand mirror 24 may be a normal mirror or a phase conjugate mirror without change in mode shape. This is definitely the case under ideal conditions wherein a true Jinc pattern is formed at the left transform plane 18. However, under more realistic conditions, additional diffraction results from certain stops either explicitly introduced at 34, as seen in FIG. 2, or implicitly introduced by the laser gain medium edges, and thus the mode pattern at the left plane 18 is not expected to be a perfect Jinc pattern. Consequently, the mode shape at the output $P_o$ of the resonator, formed by beam splitter 36 in FIG. 2, and at the right plane 16 depends to some extent upon both the Fresnel number, the stop details and the choice of mirror type at the right plane 16.

Figure 4:
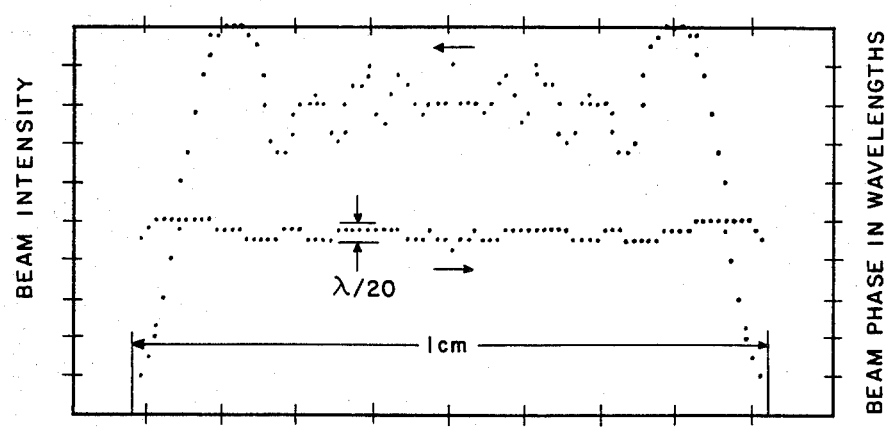
FIG. 4 is a graph of near-field intensity and phase of the output beam of the Jinc-trap resonator with a normal mirror employed at its right transform plane.
Figure 5:
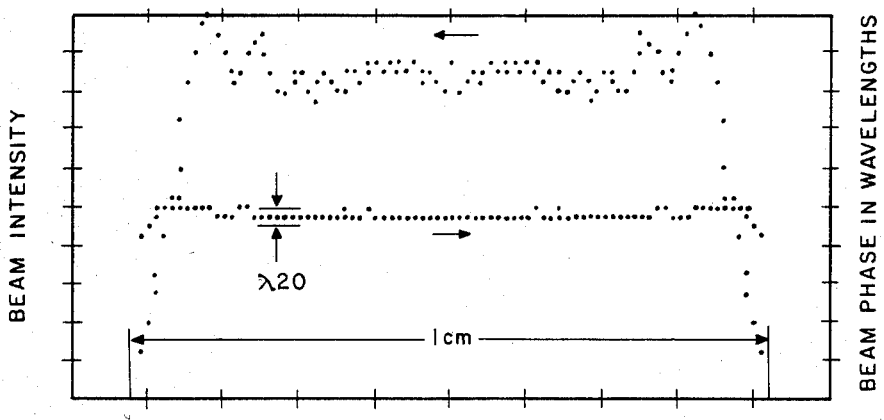
FIG. 5 is a graph of near-field intensity and phase of the output beam of the Jinc-trap resonator with a phase conjugate mirror employed at its right transform plane.
Figure 6:
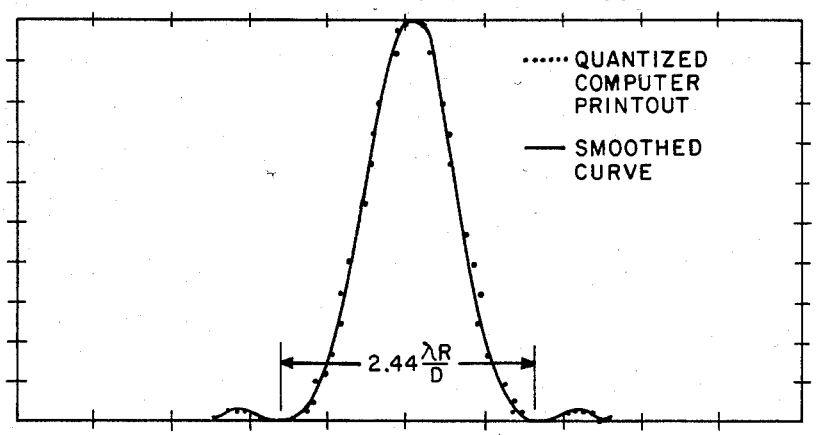
FIG. 6 is a graph of far-field intensity pattern produced by the Jinc-trap resonator with a normal mirror employed at its right transform plane.
Figure 7:
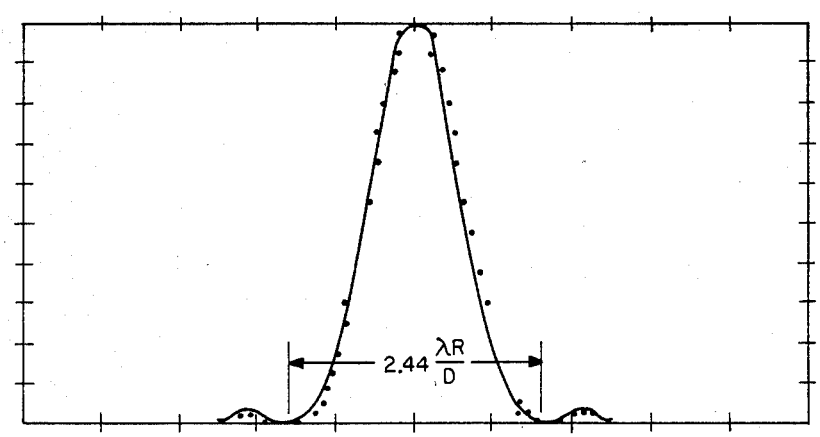
FIG. 7 is a graph of far-field intensity pattern produced by the Jinc-trap resonator with a phase-conjugate mirror employed at the right transform plane.

With a normal mirror and, alternatively, a phase conjugate mirror positioned at the right transform plane 16, the mode shape amplitude and phase profiles at the output plane for the resonator 10, as seen respectively in FIGS. 4 and 5, may be expected. Note that the phase conjugate mirror gives a somewhat flatter amplitude pattern and a slightly reduced phase error. The associated far-field patterns present at left plane 18 are illustrated in FIGS. 6 and 7. These patterns are nearly identical in shape. The resonator output $P_o$, being nearly flat in phase and of nearly uniform cross-section in amplitude, will efficiently fill a circular telescope (not shown) which may be optically coupled with the resonator.

It is thought that the Jinc-trap resonator of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A Jinc-trap resonator, comprising:
    (a) a Fourier transform lens defining an optical axis with right and left transform planes disposed along said axis one focal length from either side of the center of said lens;
    (b) a laser gain medium disposed at a location along said optical axis between said lens and a first one of said right and left transform planes of said lens;
    (c) reflecting means disposed at said first one of said transform planes of said lens; and
    (d) a Jinc-trap spatial filter disposed at a second one of said right and left transform planes of said lens, whereby a Jinc mode represented by the Bessel function $J_1(X)/(X)$ is effectively trapped at said second one of said transform planes while a corresponding transform mode that is nearly constant in amplitude and flat in phase is located at said first one of said transform planes.

2. The resonator as recited in claim 1, wherein said spatial filter is comprised of a first series of concentric absorption bands and a second series of concentric reflecting bands which alternate in position with said absorption bands.

3. The resonator as recited in claim 2, wherein an inner central circular area of said filter is reflecting.

4. The resonator as recited in claim 1, wherein said spatial filter exhibits low loss for the desired Jinc-like field distribution and much higher loss for Gaussian-like field distributions.

5. The resonator as recited in claim 1, wherein said reflecting means is a normal mirror.

6. The resonator as recited in claim 1, wherein said reflecting means is a phase conjugate mirror.

7. The resonator as recited in claim 1, further comprising:
    (e) output means disposed along said optical axis between said lens and said laser gain medium.

8. The resonator as recited in claim 7, wherein said output means comprises a beam splitter.

* * * * *